(12) United States Patent
Athley et al.

(10) Patent No.: US 10,862,636 B2
(45) Date of Patent: Dec. 8, 2020

(54) CONFIGURATION OF PHYSICAL ANTENNA PORTS (71) Applicant: TELEFONAKTIEBOLAGET LM ERICSSON (PUBL), Stockholm (SE)

(72) Inventors: Fredrik Athley, Kullavik (SE); Sven Petersson, Sävedalen (SE); Henrik Sahlin, Mölnlycke (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/421,003

(22) Filed: May 23, 2019

(65) Prior Publication Data
US 2019/0280833 A1    Sep. 12, 2019

Related U.S. Application Data

(63) Continuation of application No. 15/559,672, filed as application No. PCT/EP2017/071411 on Aug. 25, 2017, now Pat. No. 10,348,462.

(51) Int. Cl.
*H04L 5/00* (2006.01)
*H04B 7/0404* (2017.01)
*H04W 72/08* (2009.01)

(52) U.S. Cl.
CPC ......... *H04L 5/0023* (2013.01); *H04B 7/0404* (2013.01); *H04L 5/0048* (2013.01); *H04L 5/0094* (2013.01); *H04W 72/085* (2013.01)

(58) Field of Classification Search
CPC ..... H04L 5/0053; H04L 5/0023; H04L 5/001; H04L 5/0048
See application file for complete search history.

(56) References Cited

U.S. PATENT DOCUMENTS

| 10,405,332 B2 * | 9/2019 | Papasakellariou .... H04W 56/00 |
| 2008/0205539 A1 | 8/2008 | Wang et al. |
| 2010/0027697 A1 | 2/2010 | Malladi et al. |
| 2016/0192338 A1 | 6/2016 | Benjebbour et al. |

FOREIGN PATENT DOCUMENTS

WO    2014077742 A1    5/2014

OTHER PUBLICATIONS

International Search Report and Written Opinion issued in Application No. PCT/EP2017/071411 dated May 22, 2018, 16 pages.

* cited by examiner

*Primary Examiner* — Chandrahas B Patel
(74) *Attorney, Agent, or Firm* — Rothwell, Figg, Ernst & Manbeck, P.C.

(57) ABSTRACT

There is provided mechanisms for configuration of physical antenna ports. The method is performed by a first radio transceiver device. A method comprises determining a configuration for the second radio transceiver device. The configuration defines a mapping between the sub-carriers and the physical antenna ports and specifies which of the sub-carriers are to be transmitted on which physical antenna port at the second radio transceiver device. The method comprises providing the configuration to the second radio transceiver device.

18 Claims, 5 Drawing Sheets

CONFIGURATION OF PHYSICAL ANTENNA PORTS

CROSS-REFERENCE TO RELATED APPLICATIONS

This application is continuation of U.S. application Ser. No. 15/559,672, having a 35 U.S.C. § 371(c)(1) date of Sep. 19, 2017 (published as US 20190068337 on Feb. 28, 2019), which is the national stage of International Patent Application No. PCT/EP2017/071411, filed Aug. 25, 2017. The above identified applications and publication are incorporated by this reference.

TECHNICAL FIELD

Embodiments presented herein relate to methods, radio transceiver devices, computer programs, and a computer program product for configuration of physical antenna ports.

BACKGROUND

In communications networks, there may be a challenge to obtain good performance and capacity for a given communications protocol, its parameters and the physical environment in which the communications network is deployed.

The never-ceasing quest for higher data rates in communications networks has led to communications systems employing higher and higher bandwidths. This could make it challenging for terminal devices to achieve a required link budget since the power spectral density (PSD) generally decreases with increased bandwidth for a given total transmit power. This may be particularly challenging for the higher frequency bands considered for the so-called 5th generation telecommunications systems (collectively denoted 5G) since both the path loss and available bandwidth at these frequency bands are high.

For example, it could be challenging to achieve high performance in the uplink (UL), i.e., from terminal devices at the user side of the communications network to network nodes at the network side of the communications network, since the available transmit power in terminal devices may not be sufficient, particularly in handheld terminal devices, such as in so-called user equipment (UE).

One way to improve the UL link budget for terminal devices with high path loss is to reduce the bandwidth in order to obtain sufficiently high PSD at the receiver. A drawback with this approach is that the bandwidth reduction leads to reduced maximum achievable data rate, since this scales linearly with the bandwidth (not considering coding).

Another way to improve the link budget is to use multiple transmit antennas at the terminal device and apply beamforming. A potential issue with this approach is that beamforming requires channel state information (CSI) for the transmit channel. CSI at the transmitter may not always be available. Furthermore, transmit beamforming gain at the terminal device might be difficult to achieve since a rich scattering environment surrounding the terminal device and challenges in antenna design can make the antenna correlation low in the terminal device.

CSI at the transmitter can be obtained by feedback or by reciprocity. If the antenna correlation is low, a feedback approach gives high signalling overhead since no particular structure can be assumed in the quantization of the channel state. On the other hand, reciprocity mandates time-division duplex (TDD) operation and also requires that the receive branches and the transmit branches in the terminal device are calibrated.

An alternative approach to beamforming could be to transmit on a single antenna at the terminal device. However, this will not utilize all the transmit power in the terminal device if there is one power amplifier (PA) per antenna.

Yet another approach could be to use a transmit diversity scheme. However, orthogonal space-time block codes with full rate only exist for two transmit antennas.

Hence, there is still a need for ways to improve the link budget that allows the available transmit effect at the terminal devices to be utilized in an optimal way, without the need of using beamforming.

SUMMARY

An object of embodiments herein is to provide mechanisms that allow the available transmit power at a radio transceiver device to be utilized in an efficient way and that could improve the link budget.

According to a first aspect there is presented a method for configuration of physical antenna ports. The method is performed by a first radio transceiver device. The method comprises determining a configuration for the second radio transceiver device. The configuration defines a mapping between the sub-carriers and the physical antenna ports and specifies which of the sub-carriers are to be transmitted on which physical antenna port at the second radio transceiver device. The method comprises providing the configuration to the second radio transceiver device.

According to a second aspect there is presented a radio transceiver device for configuration of physical antenna ports. The radio transceiver device comprises processing circuitry. The processing circuitry is configured to cause the radio transceiver device to determine a configuration for said another radio transceiver device. The configuration defines a mapping between the sub-carriers and the physical antenna ports and specifies which of the sub-carriers are to be transmitted on which physical antenna port at said another radio transceiver device. The processing circuitry is configured to cause the radio transceiver device to provide the configuration to said another radio transceiver device.

According to a third aspect there is presented a radio transceiver device for configuration of physical antenna ports. The radio transceiver device comprises processing circuitry and a storage medium. The storage medium stores instructions that, when executed by the processing circuitry, cause the radio transceiver device to perform operations, or steps. The operations, or steps, cause the radio transceiver device to determine a configuration for said another radio transceiver device. The configuration defines a mapping between the sub-carriers and the physical antenna ports and specifies which of the sub-carriers are to be transmitted on which physical antenna port at said another radio transceiver device. The operations, or steps, cause the radio transceiver device to provide the configuration to said another radio transceiver device.

According to a fourth aspect there is presented a radio transceiver device for configuration of physical antenna ports. The radio transceiver device comprises a determine module configured to determine a configuration for said another radio transceiver device. The configuration defines a mapping between the sub-carriers and the physical antenna ports and specifies which of the sub-carriers are to be transmitted on which physical antenna port at said another radio transceiver device. The radio transceiver device comprises a provide module configured to provide the configuration to said another radio transceiver device.

According to a fifth aspect there is presented a computer program for configuration of physical antenna ports. The computer program comprises computer program code which, when run on processing circuitry of a radio transceiver device, causes the radio transceiver device to perform a method according to the first aspect.

According to a sixth aspect there is presented a method for configuration of physical antenna ports. The method is performed by a second radio transceiver device. The method comprises obtaining a configuration from a first radio transceiver device. The configuration defines a mapping between sub-carriers and the physical antenna ports and specifies which of the sub-carriers are to be transmitted on which physical antenna port at the second radio transceiver device.

According to a seventh aspect there is presented a radio transceiver device for configuration of physical antenna ports. The radio transceiver device comprises processing circuitry. The processing circuitry is configured to cause the radio transceiver device to obtain a configuration from another radio transceiver device. The configuration defines a mapping between sub-carriers and the physical antenna ports and specifies which of the sub-carriers are to be transmitted on which physical antenna port at the radio transceiver device.

According to an eighth aspect there is presented a radio transceiver device for configuration of physical antenna ports. The radio transceiver device comprises processing circuitry and a storage medium. The storage medium stores instructions that, when executed by the processing circuitry, cause the radio transceiver device to perform operations, or steps. The operations, or steps, cause the radio transceiver device to obtain a configuration from another radio transceiver device. The configuration defines a mapping between sub-carriers and the physical antenna ports and specifies which of the sub-carriers are to be transmitted on which physical antenna port at the radio transceiver device.

According to a ninth aspect there is presented a radio transceiver device for configuration of physical antenna ports. The radio transceiver device comprises an obtain module configured to obtain a configuration from another radio transceiver device. The configuration defines a mapping between sub-carriers and the physical antenna ports and specifies which of the sub-carriers are to be transmitted on which physical antenna port at the radio transceiver device.

According to a tenth aspect there is presented a computer program for configuration of physical antenna ports, the computer program comprising computer program code which, when run on processing circuitry of a radio transceiver device, causes the radio transceiver device to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these radio transceiver devices, and these computer programs allow the available transmit effect at the second radio transceiver device to be utilized in an optimal way and that could improve the link budget.

Advantageously these methods, these radio transceiver devices, and these computer programs enable full utilization of available transmit power at the second radio transceiver device, giving good coverage and reliability in cases when transmit beamforming at the second radio transceiver device is not possible or not desired.

Advantageously these methods, these radio transceiver devices, and these computer programs enable the second radio transceiver device to be scheduled an arbitrary frequency bandwidth and sub-band with full utilization of all its power amplifiers.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
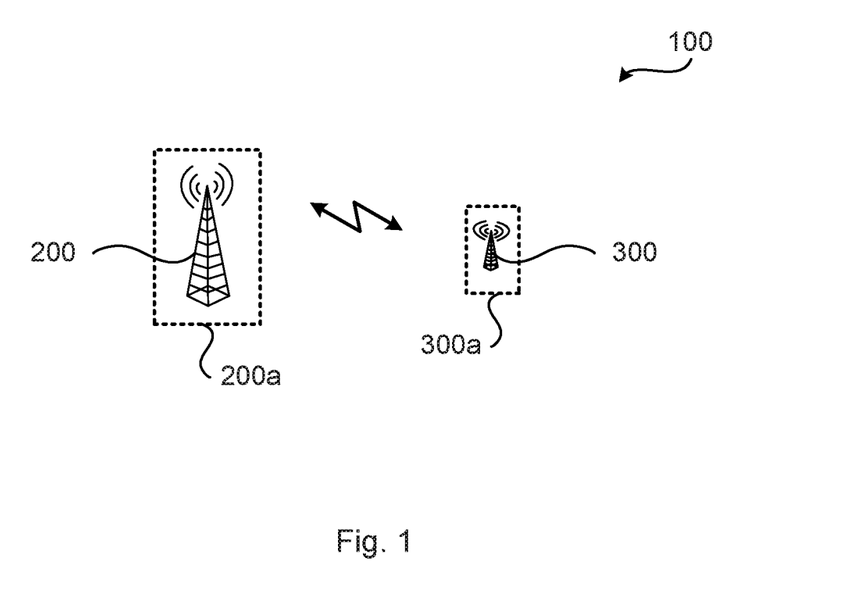
FIG. 1 is a schematic diagram illustrating a communications system according to embodiments.

FIG. 1 is a schematic diagram illustrating a communications system 100 where embodiments presented herein can be applied. The communications system 100 comprises radio transceiver devices 200, 300 that are configured to wirelessly communicate with each other over a communications channel, such as over a radio propagation channel.

For notation purposes, radio transceiver device 200 will hereinafter be denoted a first radio transceiver device, and radio transceiver device 300 will hereinafter be denoted a second radio transceiver device. However, this does necessarily not imply that there is any hierarchical relationship between the radio transceiver devices 200, 300.

In some aspects the first radio transceiver device 200 is part of a network node 200a, and the second radio transceiver device 300 is part of a terminal device 300a. This enables the herein disclosed embodiments to be applied in scenarios where the radio link from the first radio transceiver device 200 to the second radio transceiver device 300 is a downlink, and where the radio link from the second radio transceiver device 300 to the first radio transceiver device 200 is an uplink.

However, in other aspects the first radio transceiver device 200 and the second radio transceiver device 300 are part of the same type of node, or device, and where the first radio transceiver device 200 and the second radio transceiver device 300 thus might be considered as peer nodes, or devices. This enables the herein disclosed embodiments to be applied in scenarios where the radio transceiver devices 200, 300 communicate with each other using sidelinks.

The network node 200a could be any of a radio access network node, radio base station, base transceiver station, Node B, evolved Node B, gNB, access point, or an access node.

The terminal device 200a could be any of a portable wireless device, mobile station, mobile phone, handset, wireless local loop phone, user equipment (UE), smartphone, laptop computer, tablet computer, wireless modem, wireless sensor device, Internet of Things (IoT) device, or a network-equipped vehicle.

As disclosed above it could challenging to achieve high performance in the uplink (or in the sidelink) and there is therefore a need for ways to improve the link budget that allows the available transmit effect at the second radio transceiver device 300 to be utilized in an optimal way.

An objective of the herein disclosed embodiments is to enable the use of all power amplifiers in an active antenna of the second radio transceiver device 300, without performing any beamforming. In general terms and as will be disclosed in more detail below, this could be achieved by applying a frequency dependent antenna virtualization that maps different sub-carriers to different physical antenna ports of the second radio transceiver device 300 such that different physical antenna ports use orthogonal radio resources.

The embodiments disclosed herein in particular relate to mechanisms for configuration of physical antenna ports. In order to obtain such mechanisms there is provided a first radio transceiver device 200, a method performed by the first radio transceiver device 200, a computer program product comprising code, for example in the form of a computer program, that when run on processing circuitry of the first radio transceiver device 200, causes the first radio transceiver device 200 to perform the method. In order to obtain such mechanisms there is further provided a second radio transceiver device 300, a method performed by the second radio transceiver device 300, and a computer program product comprising code, for example in the form of a computer program, that when run on processing circuitry of the second radio transceiver device 300, causes the second radio transceiver device 300 to perform the method.

Figure 2:
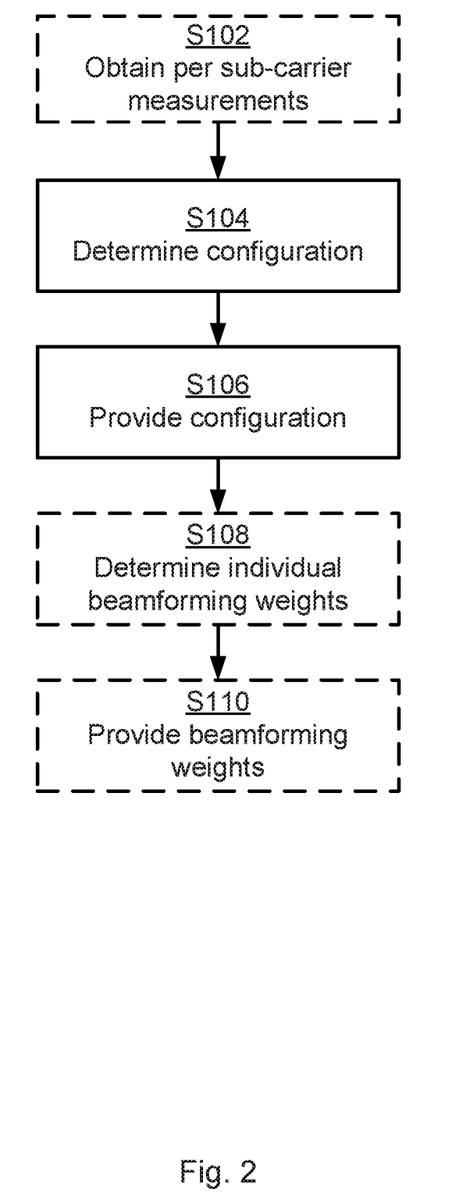
FIGS. 2 and 3 are flowcharts of methods according to embodiments.

Reference is now made to FIG. 2 illustrating a method for configuration of physical antenna ports as performed by the first radio transceiver device 200 according to an embodiment.

Particularly, the first radio transceiver device 200 is configured to perform step S104:

S104: The first radio transceiver device 200 determines a configuration for the second radio transceiver device 300. The configuration defines a mapping between the sub-carriers and the physical antenna ports and specifies which of the sub-carriers are to be transmitted on which physical antenna port at the second radio transceiver device 300. Further aspects, embodiments and examples of the configuration will be provided below.

The configuration is provided to the second radio transceiver device 300. Thus, the first radio transceiver device 200 is configured to perform step S106:

S106: The first radio transceiver device 200 provides the configuration to the second radio transceiver device 300. Embodiments relating to how the configuration could be provided to the second radio transceiver device 300 will be disclosed below.

Embodiments relating to further details of configuration of physical antenna ports as performed by the first radio transceiver device 200 will now be disclosed.

In some aspects the configuration is based on measurements of reference signals, where the reference signals are transmitted by the second radio transceiver device 300. Particularly, according to an embodiment the first radio transceiver device 200 is configured to perform optional step S102:

S102: The first radio transceiver device 200 obtains per sub-carrier measurements of reference signals. The reference signals have been transmitted on sub-carriers and from physical antenna ports of the second radio transceiver device 300. In this respect, although the measurements are obtained per sub-carrier, this does not necessarily imply that measurements are obtained for each and every sub-carrier.

Examples of reference signals will be provided below. The measurements are then used by the first radio transceiver device 200 to determine the configuration, as in step S104.

In other aspects the first radio transceiver device 200 is without detailed channel knowledge, such as how the channel gain varies within the bandwidth for each physical antenna port. In such scenarios an equal amount of sub-carriers can be allocated to each physical antenna port over the system bandwidth, such as in FIG. 5(a) or FIG. 5(f). Scenarios where some channel knowledge is available to the first radio transceiver device 200 are also envisioned and may result in allocations as in FIGS. 5(b)-5(e). Further details of FIG. 5 will be disclosed below.

There may be different ways to determine the configuration so as to define the mapping between the sub-carriers and the physical antenna ports.

In some aspects the mapping reflects channel path gain distribution, resulting in a frequency selective mapping. Particularly, according to an embodiment the mapping reflects channel path gain values according to their distribution over the physical antenna ports. The measurements might then indicate a respective one of the channel path gain values for each of the physical antenna ports. Further, the first radio transceiver device 200 might have access to information about how the channel gain varies over frequency for each physical antenna port and then allocate the sub-carriers so that particular sub-carriers are transmitted on physical antenna ports that have high channel gain for those sub-carriers. The first radio transceiver device 200 might then need to have access to information describing how the channel gain for the sub-carriers varies over frequency for the different physical antenna ports. This information can be obtained from the per-subcarrier measurements.

Further, the configuration could be determined such that the mapping is based on that physical antenna ports with a comparatively high channel gain are allocated a comparatively large bandwidth and physical antenna ports with a comparatively low channel gain are allocated a comparatively small bandwidth such that the received PSD at the first radio transceiver device 200 is approximately the same for all physical antenna ports. That is, according to an embodiment the measurements indicate a respective channel path gain value for each of the physical antenna ports, and the configuration is determined such that more sub-carriers are mapped to those physical antenna ports with higher channel path gain than those physical antenna ports with lower channel path gain. In this respect, the measurements of the reference signals can be used to perform channel estimation from which frequency-dependent channel gain values can be obtained. Then, according to an embodiment the measurements (more precisely, the result of the channel estimation that is based on the measurements) indicate signal strength per sub-carrier for each of the physical antenna ports 430a, 430b, 430c, 430d, and the configuration is determined such that the sub-carriers are mapped to the physical antenna ports 430a, 430b, 430c, 430d according to the signal strength. This enables the sub-carriers to be allocated to the physical antenna ports 430a, 430b, 430c, 430d such that a given physical antenna port 430a, 430b, 430c, 430d gets the sub-carriers that are strong for that given physical antenna port 430a, 430b, 430c, 430d.

In some aspects each individual sub-carrier is only be used by one physical antenna ports or one group of physical antenna ports. That is, according to an embodiment the configuration is determined such that orthogonal radio resources are used for at least two groups of the physical antenna ports.

Each group might have a single physical antenna port. That is, according to an embodiment, each group of physical antenna ports comprises only a single physical antenna port. Alternatively, there is at least one group that has two or more physical antenna ports. That is, according to an embodiment at least one of the groups of physical antenna ports comprises at least two physical antenna ports. This will be further illustrated below with reference to FIG. 4. Further, not all groups might have the same number of physical antenna ports, although this is the case in the illustrative examples provided below.

There could be different ways for the first radio transceiver device 200 to provide the configuration to the second radio transceiver device 300. In some aspects the first radio transceiver device 200 as part of step S106 sends a configuration message to the second radio transceiver device 300, e.g. informing the second radio transceiver device 300 to apply the configuration. The configuration could be signaled in many different ways, e.g., as a bitmap, as an index to a table of predefined configurations, or as an explicit mapping between the sub-carriers and the physical antenna ports. The bitmap, index, or explicit mapping could be compressed in order to reduce signalling overhead.

There could be different ways for the first radio transceiver device 200 to be triggered to perform configuration. In some aspects the configuration is performed on a per need basis. Particularly, according to an embodiment, performing the determining of the configuration (as in step S104) is triggered by the measurements indicating that reference signal received power (RSRP) of the reference signals is below a threshold value. That is, according to some aspects the first radio transceiver device 200 monitors (either periodically or aperiodically), and performs measurements on, reference signals as transmitted by the second radio transceiver and, as soon as the RSRP is below the threshold value, performs the determining of the configuration (as in step S104). Further, the configuration can be triggered based on measurements performed by the first radio transceiver device 200 or the second radio transceiver device 300. The proposed configuring might thus be applied dynamically on a per-need basis, so that only second radio transceiver devices 300 of terminal devices 300a with uplink coverage problems apply the configuration. For second radio transceiver devices 300 of terminal devices 300a having good channel conditions it may be more efficient not to use any configuration.

In scenarios where the signal from the physical antenna is transmitted on orthogonal resources, there will not be any beamforming. However, although the herein disclosed configuration can be applied without beamforming, in some aspects, the configuration is combined with determination of beamforming weights. Particularly, according to an embodiment the first radio transceiver device 200 is configured to perform optional steps S108 and S110:

S108: The first radio transceiver device 200 determines individual beamforming weights for each physical antenna port within each group comprising at least two physical antenna ports based on the measurements.

S110: The first radio transceiver device 200 provides information of the individual beamforming weights to the second radio transceiver device 300. As for the configuration, the information could be provided as an index to a table of beamforming weights, or as explicit beamforming weight values.

Further aspects of how to apply the beamforming weights to the physical antenna ports will be disclosed below.

Figure 3:
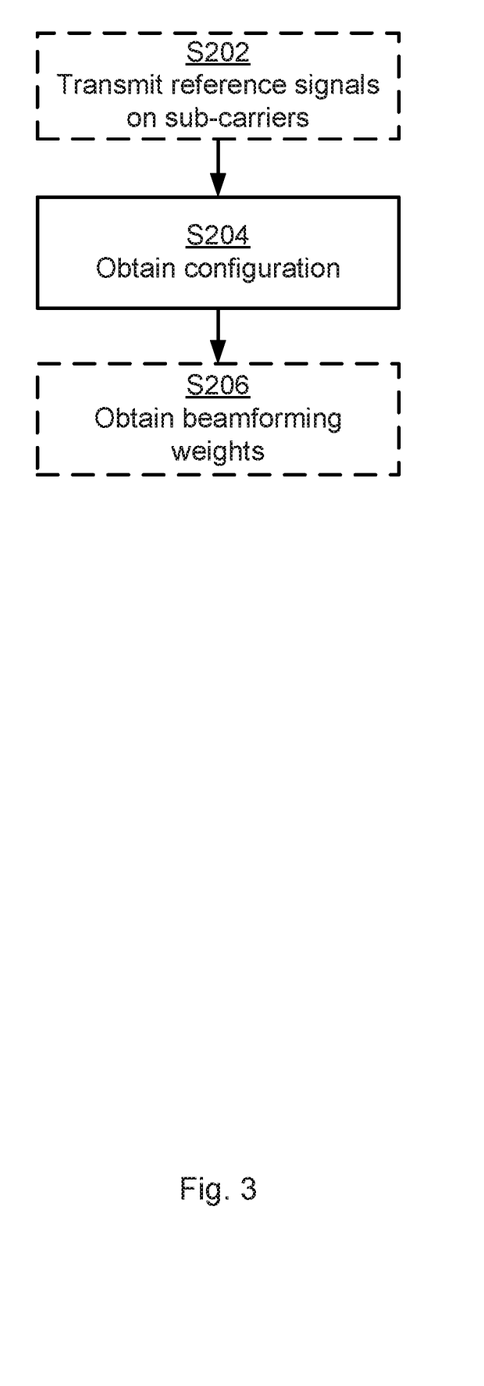

Reference is now made to FIG. 3 illustrating a method for configuration of physical antenna ports as performed by the second radio transceiver device 300 according to an embodiment.

The first radio transceiver device 200 determines the configuration (as in step S104) and provides the configuration (as in step S106) to the second radio transceiver device 300. The second radio transceiver device 300 is therefore configured to perform step S204:

S204: The second radio transceiver device 300 obtains a configuration the first radio transceiver device 200. As disclosed above, the configuration defines a mapping between the sub-carriers and the physical antenna ports and specifies which of the sub-carriers are to be transmitted on which physical antenna port at the second radio transceiver device 300.

Embodiments relating to further details of configuration of physical antenna ports as performed by the second radio transceiver device 300 will now be disclosed.

In some aspects, as disclosed above, the configuration is based on reference signals as transmitted by the second radio transceiver device 300. Therefore, according to an embodiment the second radio transceiver device 300 is configured to perform (optional) step S202:

S202: The second radio transceiver device 300 transmits reference signals on sub-carriers and from physical antenna ports of the second radio transceiver device 300.

In some aspects the second radio transceiver device 300 comprises an antenna array of active antennas and the physical antenna ports are part of the active antennas.

There could be different examples of reference signals. According to a non-limiting example the second radio transceiver device 300 transmits sounding reference signals (SRSs) on its physical antenna ports using, e.g., different combs or cyclic shifts of a Zadoff-Chu sequence such that the first radio transceiver device 200 obtains CSI for all physical antenna ports of the second radio transceiver device 300 over the bandwidth of interest.

In some aspects the configuration is received from the same radio transceiver device that received the reference signals. That is, according to an embodiment the configuration is obtained from the first radio transceiver device 200 having received the reference signals.

As disclosed above, in some aspects each individual sub-carrier is either only used by one physical antenna or by one group of physical antenna ports. That is, according to an embodiment the configuration is determined such that orthogonal radio resources are used for at least two groups of the physical antenna ports.

As further disclosed above, each group might have a single physical antenna port. That is, according to an embodiment, each group of physical antenna ports comprises only a single physical antenna port. Alternatively, there is at least one group that has two or more physical antenna ports. That is, according to an embodiment at least one of the groups of physical antenna ports comprises at least two physical antenna ports.

There could be different ways for the second radio transceiver device 300 to obtain the configuration from the first radio transceiver device 200.

In some aspects the second radio transceiver device 300 as part of step S204 receives a configuration message from the first radio transceiver device 200, e.g. receiving information that the second radio transceiver device 300 is to apply the configuration. The configuration could be obtained in many different ways, e.g., as a bitmap, as an index to a table of predefined configurations, or as an explicit mapping between the sub-carriers and the physical antenna ports. The bitmap, index, or explicit mapping could be compressed in order to reduce signalling overhead.

As further disclosed above, the configuration is in some aspects combined with determination of beamforming weights. Particularly, according to an embodiment the second radio transceiver device 300 is configured to perform optional step S206:

S206: The second radio transceiver device 300 obtains information of individual beamforming weights from the first radio transceiver device 200 for each physical antenna port within each group comprising at least two physical antenna ports. The individual beamforming weights are based on measurements of the reference signals. As for the configuration, the information could be obtained as an index to a table of beamforming weights, or as explicit beamforming weight values.

There could be different situations for which the second radio transceiver device 300 applies the configuration. In some aspects the second radio transceiver device 300 applies the configuration when transmitting (uplink or sidelink) data. That is, according to an embodiment the configuration is to be used for transmission of data from the second radio transceiver device 300 to the first radio transceiver device 200.

Aspects, embodiments, and examples equally applicable to the first radio transceiver device 200 and the second radio transceiver device 300 will now be disclosed.

In some aspects the first radio transceiver device 200 in the configuration determines virtual antenna port(s) for the second radio transceiver device 300 by defining a sub-carrier interleaved virtualization that maps different sub-carriers to different physical antenna ports such that each sub-carrier is mapped to one, or possibly a group of, physical antenna ports per virtual antenna port. That is, according to an embodiment a virtual antenna port is defined by a distribution of the sub-carriers over the physical antenna ports. In further detail, the virtual antenna port could be defined by the mapping between the sub-carriers and the physical antenna ports such that each sub-carrier is mapped to at most one group of physical antenna ports per virtual antenna port. In this respect, a group is generally defined as the set of physical antenna ports that belong to the same virtual antenna port and transmit on the same sub-carriers.

Figure 4:
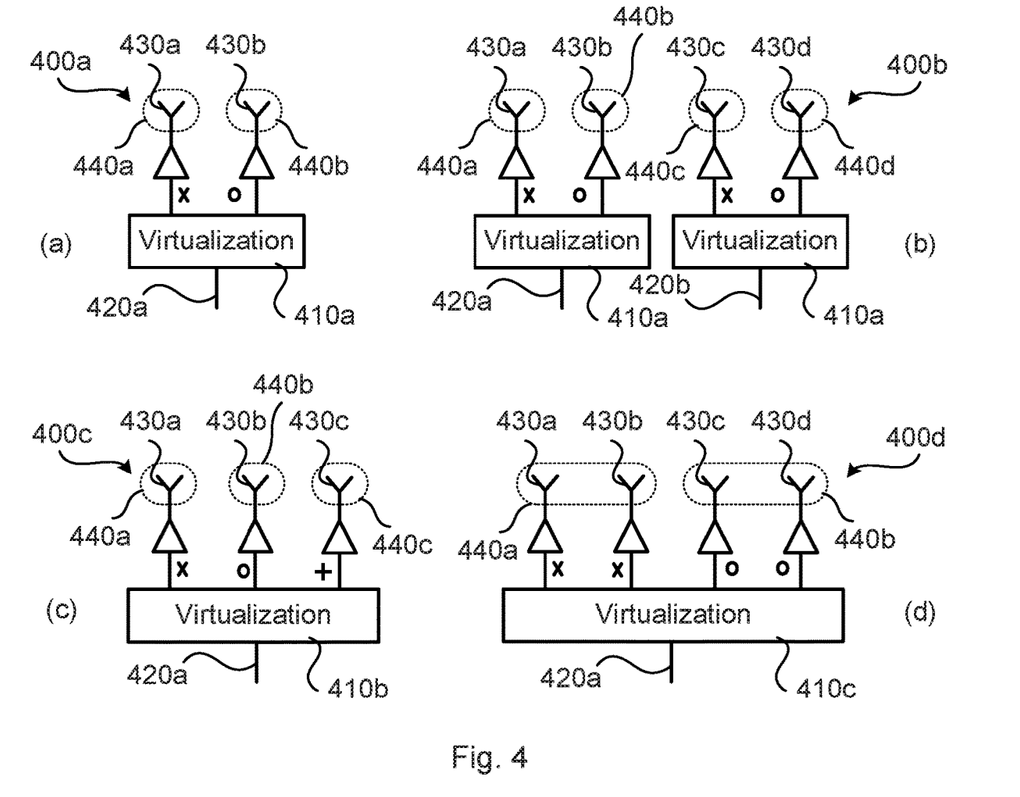
FIG. 4 is a schematic illustration of examples of virtualizations between virtual antenna ports and physical antenna ports according to embodiments.

FIG. 4 schematically illustrates at (a), (b), (c), and (d) examples of virtualizations 400a, 400b, 400c, flood between virtual antenna ports 420a, 420b and physical antenna ports 430a, 430b, 430c, 430d at the second radio transceiver device 300, where each sub-carrier (denoted 'x', 'o', '+') is mapped to a respective group 440a, 440b, 440c, 440d of physical antenna ports 430a, 430b, 430c, 430d per virtual antenna port 420a, 420b. The virtualization is represented by virtualization modules 410a, 410b, 410c.

In example (a) there are one virtual antenna port 420a and two groups 440a, 440b of physical antenna ports (with one single member in each group), and the physical antenna port 430a transmits on sub-carriers marked with an 'x' whereas the physical antenna port 430b transmits on sub-carrier marked with an 'o', as implemented by a virtualization module 410a.

In example (b) there are two virtual antenna ports 420a, 420b and four groups 440a, 440b, 440c, 440d of physical antenna ports (with one single member in each group), and the physical antenna ports 430a, 430c transmit on sub-carriers marked with an 'x' whereas the physical antenna ports 430b, 430d transmit on sub-carrier marked with an 'o', as implemented by two (identical) virtualization modules 410a, 410a.

In example (c) there are one virtual antenna port 420a and three groups 440a, 440b, 440c of physical antenna ports (with one single member in each group), and the physical antenna port 430a transmits on sub-carriers marked with an 'x' whereas the physical antenna port 430b transmits on sub-carrier marked with an 'o' and the physical antenna port 430c transmits on sub-carrier marked with an '+', as implemented by a virtualization module 410b.

In example (d) there are one virtual antenna port 420a and two groups 440a, 440b of physical antenna ports, and the physical antenna ports 430a, 430b transmit on sub-carriers marked with an 'x' whereas the physical antenna ports 430c, 430d transmit on sub-carrier marked with an 'o', as implemented by a virtualization modules 410c.

The examples can be generalized to reducing N physical antenna ports down to M virtual antenna ports. This allows for beamforming or spatial multiplexing over the virtual antenna ports, if desired. Further, where a sub-carrier is mapped to a group of at least two physical antenna ports (such as in example (d)), beamforming is performed within this group. The second radio transceiver device 300 then needs to know what beamforming weights to apply within a group. This can be determined by the first radio transceiver device 200 by measurements on the reference signals and signaled to the second radio transceiver device 300, as in above disclosed steps S108, S110, S206, or if reciprocity holds, be measured on the link from the first second radio transceiver device 200 to the second radio transceiver device 300 and determined by the second radio transceiver device 300.

In some aspects the reference signals are transmitted (by the second radio transceiver device 300) within a system bandwidth, and the mapping between the sub-carriers and the physical antenna ports 430a, 430b, 430c, 430d is only made for sub-carriers within the system bandwidth. In other aspects the mapping between the sub-carriers and the physical antenna ports 430a, 430b, 430c, 430d is only made for sub-carriers within less than whole the system bandwidth.

Figure 5:
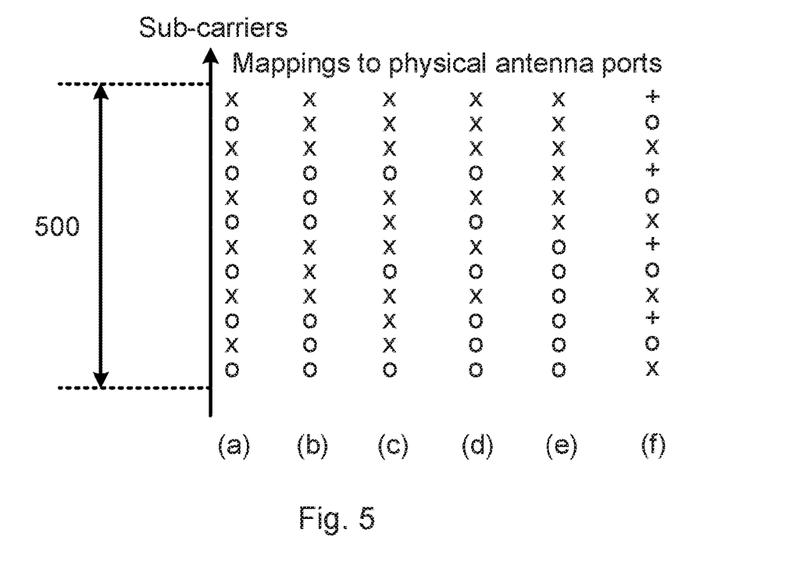
FIG. 5 is a schematic illustration of examples of configurations defining mappings between sub-carriers and physical antenna ports according to embodiments.

FIG. 5 schematically illustrates at (a), (b), (c), (d), (e), and (f) examples of configurations defining mappings between 12 sub-carriers and physical antenna ports, where the sub-carriers are located within a system bandwidth 500.

In example (a) one physical antenna port (or group thereof) transmits data on every other sub-carrier (all those marked with an 'x') whereas another physical antenna port (or group thereof) transmits data on the remaining sub-carriers (all those marked with an 'o'). In this example each power amplifier thus only transmits data on every other sub-carrier, and the transmitted power per subcarrier per power amplifier could be twice as high compared to when it is transmitting on every sub-carrier.

If the physical antenna ports have a large channel gain difference, there may be issues with sub-carrier leakage in the receiver due to rapid and strong fluctuations of received power between adjacent sub-carriers. An alternative configuration that mitigates this issue is illustrated in example (b), where chunks of three sub-carriers are mapped to the respective (group of) physical antenna ports in an interleaved manner.

If the physical antenna ports have different path gain, it might be beneficial to allocate more bandwidth to the physical antenna port(s) with high path gain so that the received power per sub-carrier becomes approximately constant. For example, if one of the physical antenna ports (or group thereof) has three times higher path gain than another physical antenna port (or group thereof), this one of the physical antenna ports (or group thereof) can be allocated three times as many subcarriers as the so-called another physical antenna port (or group thereof). In this way, the received power will be the same for all sub-carriers. An example of such a virtualization is illustrated in example (c).

Yet another configuration is illustrated in example (d) where the sub-carrier interleaved mapping is only applied in a part of the system bandwidth 500. In the lower and higher ends of the system bandwidth 500, all sub-carriers are mapped to one physical antenna port (or group thereof).

It is also possible that there is no subcarrier interleaved mapping, and instead disjoint sub-bands of sub-carriers are allocated to different physical antenna ports (or groups thereof). This is illustrated in example (e), where all sub-carriers in the upper half of the system bandwidth 500 are mapped to one physical antenna port (or group thereof) and where all sub-carriers in the lower half of the system bandwidth 500 are mapped to another physical antenna port (or group thereof).

As disclosed above with reference to FIG. 4 there could be three or more physical antenna ports per virtual antenna port. Example (f) illustrates a similar example as in example (a) of FIG. 5 but where a first physical antenna port (or group thereof) transmits on all sub-carriers marked with an 'x', where a second physical antenna port (or group thereof) transmits on all sub-carriers marked with an with an 'o', and where a third physical antenna port (or group thereof) transmits on all sub-carriers marked with an with an '+'.

All the above configurations achieve the objective to transmit data on virtual antenna ports using all available power amplifiers without the need to perform any beamforming.

In summary, the first radio transceiver device 200 configures the second radio transceiver device 300 to create one or more virtual antenna ports using a frequency selective virtualization that maps different sub-carriers to different physical antenna ports such that each sub-carrier is mapped to one or several physical antenna ports per virtual antenna port.

Figure 6:
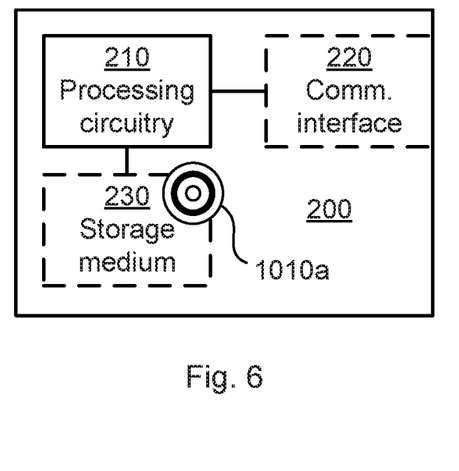
FIG. 6 is a schematic diagram showing functional units of a radio transceiver device according to an embodiment.

FIG. 6 schematically illustrates, in terms of a number of functional units, the components of a first radio transceiver device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010a (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the first radio transceiver device 200 to perform a set of operations, or steps, S102-S110, as disclosed above. For example, the storage medium 230 may store the set of operations, and the processing circuitry 210 may be configured to retrieve the set of operations from the storage medium 230 to cause the first radio transceiver device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The first radio transceiver device 200 may further comprise a communications interface 220 for communications with the second radio transceiver device 300. As such the communications interface 220 may comprise one or more transmitters and receivers, comprising analogue and digital components.

The processing circuitry 210 controls the general operation of the first radio transceiver device 200 e.g. by sending data and control signals to the communications interface 220 and the storage medium 230, by receiving data and reports from the communications interface 220, and by retrieving data and instructions from the storage medium 230. Other components, as well as the related functionality, of the first radio transceiver device 200 are omitted in order not to obscure the concepts presented herein.

Figure 7:
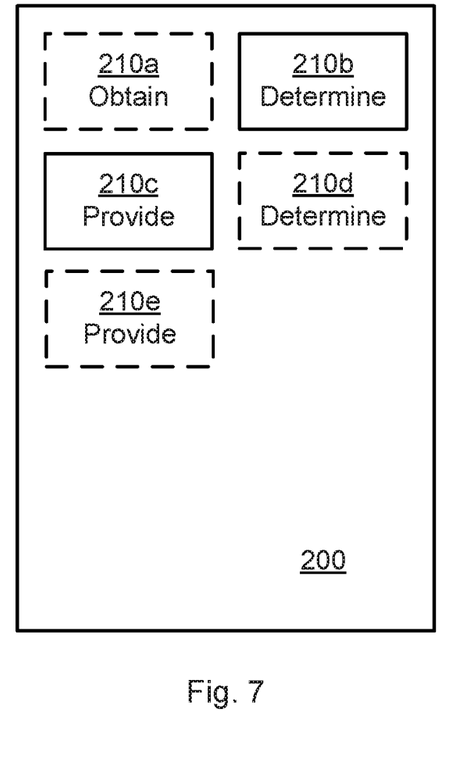
FIG. 7 is a schematic diagram showing functional modules of a radio transceiver device according to an embodiment.

FIG. 7 schematically illustrates, in terms of a number of functional modules, the components of a first radio transceiver device 200 according to an embodiment. The first radio transceiver device 200 of FIG. 7 comprises a number of functional modules; a determine module 210b configured to perform step S104, and a provide module 210c configured to perform step S106. The first radio transceiver device 200 of FIG. 7 may further comprise a number of optional functional modules, such as any of an obtain module 210a configured to perform step S102, a determine module 210d configured to perform step S108, and a provide module 210e configured to perform step S110. In general terms, each functional module 210a-210e may be implemented in hardware or in software. Preferably, one or more or all functional modules 210a-210e may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210e and to execute these instructions, thereby performing any steps of the first radio transceiver device 200 as disclosed herein.

Figure 8:
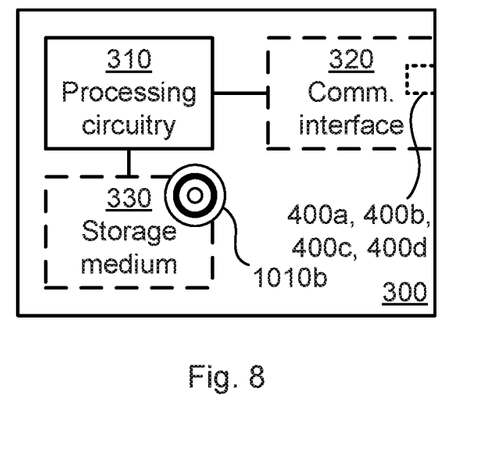
FIG. 8 is a schematic diagram showing functional units of a radio transceiver device according to an embodiment.

FIG. 8 schematically illustrates, in terms of a number of functional units, the components of a second radio transceiver device 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1010b (as in FIG. 10), e.g. in the form of a storage medium 330. The processing circuitry 310 may further be provided as at least one application specific integrated circuit (ASIC), or field programmable gate array (FPGA).

Particularly, the processing circuitry 310 is configured to cause the second radio transceiver device 300 to perform a set of operations, or steps, S202-S206, as disclosed above. For example, the storage medium 330 may store the set of operations, and the processing circuitry 310 may be configured to retrieve the set of operations from the storage medium 330 to cause the second radio transceiver device 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The second radio transceiver device 300 may further comprise a communications interface 320 for communications with the first radio transceiver device 200. As such the communications interface 320 may comprise one or more transmitters and receivers, comprising analogue and digital components.

The processing circuitry 310 controls the general operation of the second radio transceiver device 300 e.g. by sending data and control signals to the communications interface 320 and the storage medium 330, by receiving data and reports from the communications interface 320, and by retrieving data and instructions from the storage medium 330. Other components, as well as the related functionality, of the second radio transceiver device 300 are omitted in order not to obscure the concepts presented herein.

Figure 9:
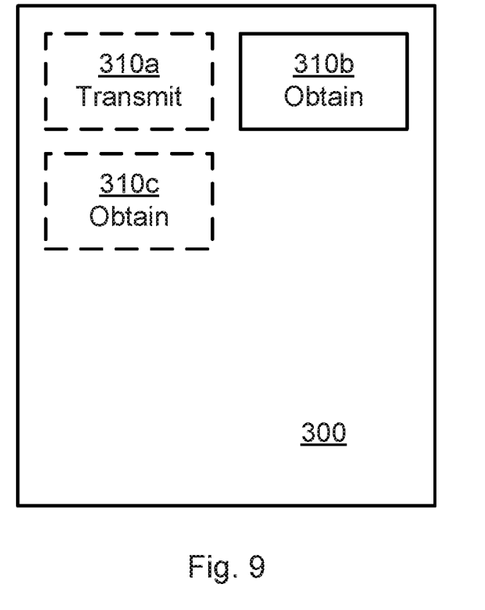
FIG. 9 is a schematic diagram showing functional modules of a radio transceiver device according to an embodiment.

FIG. 9 schematically illustrates, in terms of a number of functional modules, the components of a second radio transceiver device 300 according to an embodiment. The second radio transceiver device 300 of FIG. 9 comprises an obtain module 310b configured to perform step S204. The second radio transceiver device 300 of FIG. 9 may further comprise a number of optional functional modules, such as any of a transmit module 310a configured to perform step S202 and an obtain module 310c configured to perform step S206. In general terms, each functional module 310a-310c may be implemented in hardware or in software. Preferably, one or more or all functional modules 310a-310c may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310c and to execute these instructions, thereby performing any steps of the second radio transceiver device 300 as disclosed herein.

The first radio transceiver device 200 and/or second radio transceiver device 300 may be provided as a standalone device or as a part of at least one further device. For example, the first radio transceiver device 200/second radio transceiver device 300 may be provided in a node of a radio access network or in a node of a core network, or in a user device. Alternatively, functionality of the first radio transceiver device 200 and/or second radio transceiver device 300 may be distributed between at least two devices, or nodes. These at least two nodes, or devices, may either be part of the same network part (such as the radio access network or the core network, or the user-side) or may be spread between at least two such network parts.

Thus, a first portion of the instructions performed by the first radio transceiver device 200 and/or second radio transceiver device 300 may be executed in a respective first device, and a second portion of the of the instructions performed by the first radio transceiver device 200 and/or second radio transceiver device 300 may be executed in a respective second device; the herein disclosed embodiments are not limited to any particular number of devices on which the instructions performed by the first radio transceiver device 200 and/or second radio transceiver device 300 may be executed. Hence, the methods according to the herein disclosed embodiments are suitable to be performed by a first radio transceiver device 200 and/or second radio transceiver device 300 residing in a cloud computational environment. Therefore, although a single processing circuitry 210, 310 is illustrated in FIGS. 6 and 8 the processing circuitry 210, 310 may be distributed among a plurality of devices, or nodes. The same applies to the functional modules 210a-210e, 310a-310c of FIGS. 7 and 9 and the computer programs 1020a, 1020b of FIG. 10 (see below).

Figure 10:
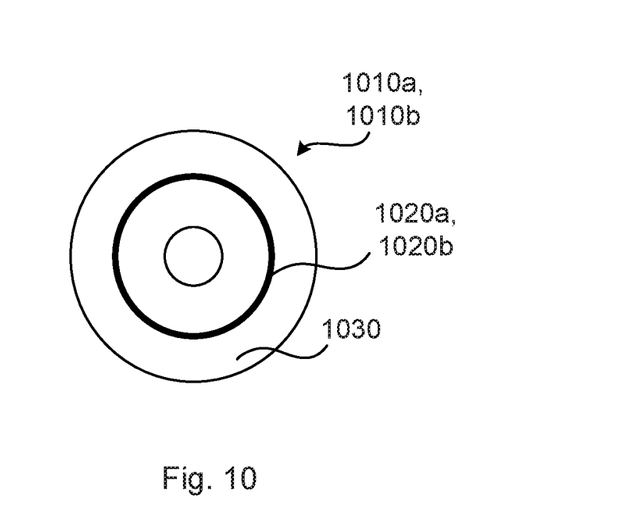
FIG. 10 shows one example of a computer program product comprising computer readable means according to an embodiment.

FIG. 10 shows one example of a computer program product 1010a, 1010b comprising computer readable means 1030. On this computer readable means 1030, a computer program 1020a can be stored, which computer program 1020a can cause the processing circuitry 210 and thereto operatively coupled entities and devices, such as the communications interface 220 and the storage medium 230, to execute methods according to embodiments described herein. The computer program 1020a and/or computer program product 1010a may thus provide means for performing any steps of the first radio transceiver device 200 as herein disclosed. On this computer readable means 1030, a computer program 1020b can be stored, which computer program 1020b can cause the processing circuitry 310 and thereto operatively coupled entities and devices, such as the communications interface 320 and the storage medium 330, to execute methods according to embodiments described herein. The computer program 1020b and/or computer program product 1010b may thus provide means for performing any steps of the second radio transceiver device 300 as herein disclosed.

In the example of FIG. 10, the computer program product 1010a, 1010b is illustrated as an optical disc, such as a CD (compact disc) or a DVD (digital versatile disc) or a Blu-Ray disc. The computer program product 1010a, 1010b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020a, 1020b is here schematically shown as a track on the depicted optical disk, the computer program 1020a, 1020b can be stored in any way which is suitable for the computer program product 1010a, 1010b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for configuration of physical antenna ports, the method being performed by a first radio transceiver device, the method comprising:
   the first radio transceiver device generating configuration information for a second radio transceiver device, the configuration information (i) defining a mapping between sub-carriers and the physical antenna ports and (ii) specifying which of the sub-carriers are to be transmitted on which physical antenna port at the second radio transceiver device; and
   the first radio transceiver device providing to the second radio transceiver device the configuration information that the second radio transceiver device is to apply for data transmission.

2. A computer program product comprising a non-transitory computer readable medium storing a computer program for configuration of physical antenna ports, the computer program comprising computer code which, when run on processing circuitry of a radio transceiver device, causes the radio transceiver device to perform the method of claim 1.

3. The method of claim 1, wherein the configuration information is generated such that orthogonal radio resources are used for at least two groups of the physical antenna ports.

4. The method of claim 1, further comprising:
   obtaining per sub-carrier measurements of reference signals, the reference signals having been transmitted on sub-carriers and from physical antenna ports of a second radio transceiver device, wherein the configuration information is generated based on the measurements.

5. The method of claim 4, wherein the measurements indicate a respective channel path gain value for each of the physical antenna ports, and wherein the configuration information is generated such that more sub-carriers are mapped to those physical antenna ports with higher channel path gain than those physical antenna ports with lower channel path gain.

6. The method of claim 4, wherein the measurements indicate signal strength per sub-carrier for each of the physical antenna ports, and wherein the configuration information is generated such that the sub-carriers are mapped to the physical antenna ports according to the signal strength.

7. The method of claim 4, further comprising:
   determining individual beamforming weights for each physical antenna port within each group comprising at least two physical antenna ports based on the measurements; and
   providing information of the individual beamforming weights to the second radio transceiver device.

8. The method of claim 4, wherein generating the configuration information is triggered by the measurements indicating that reference signal received power, RSRP, of the reference signals is below a threshold value.

9. The method of claim 4, wherein
   the mapping reflects channel path gain values according to their distribution over the physical antenna ports, and
   the measurements indicate a respective one of the channel path gain values for each of the physical antenna ports.

10. A method for configuration of physical antenna ports, the method being performed by a second radio transceiver device, the method comprising:
    the second radio transceiver device obtaining configuration information from a first radio transceiver device, the configuration information defining a mapping between sub-carriers and the physical antenna ports and the configuration information specifying which of the sub-carriers are to be transmitted on which physical antenna port at the second radio transceiver device; and
    the second radio transceiver device using the configuration information for data transmission.

11. The method of claim 10, wherein the configuration information is determined such that orthogonal radio resources are used for at least two groups of the physical antenna ports.

12. The method of claim 10, wherein
    a virtual antenna port is a combination of at least two physical antenna ports, wherein the combination is defined by a distribution of the sub-carriers over the physical antenna ports, and
    the virtual antenna port is defined by the mapping between the sub-carriers and the physical antenna ports such that each sub-carrier is mapped to at most one group of physical antenna ports per virtual antenna port.

13. The method of claim 10, wherein the reference signals are transmitted within a system bandwidth, and wherein the mapping between the sub-carriers and the physical antenna ports only is made for sub-carriers within the system bandwidth.

14. The method of claim 10, wherein the mapping between the sub-carriers and the physical antenna ports only is made for sub-carriers within less than whole the system bandwidth.

15. The method of claim 10, further comprising:
    transmitting reference signals on the sub-carriers and from physical antenna ports of the second radio transceiver device.

16. A computer program product comprising a non-transitory computer readable medium storing a computer program for configuration of physical antenna ports, the computer program comprising computer code which, when run on processing circuitry of a radio transceiver device, causes the radio transceiver device to perform the method of claim 10.

17. A radio transceiver device comprising processing circuitry, the processing circuitry being configured to cause the radio transceiver device to:
    generate configuration information for another radio transceiver device, the configuration information (i)

defining a mapping between sub-carriers and physical antenna ports and (ii) specifying which of the sub-carriers are to be transmitted on which physical antenna port at said another radio transceiver device; and provide to said another radio transceiver device the configuration information that said second radio transceiver device is to use for data transmission.

18. A radio transceiver device, the radio transceiver device comprising processing circuitry, the processing circuitry being configured to cause the radio transceiver device to:

obtain configuration information from another radio transceiver device, the configuration information (i) defining a mapping between sub-carriers and physical antenna ports and (ii) specifying which of the sub-carriers are to be transmitted on which physical antenna port at the radio transceiver device; and use the configuration information for data transmission.

* * * * *